United States Patent
Kale et al.

(10) Patent No.: US 7,519,679 B2
(45) Date of Patent: Apr. 14, 2009

(54) TARGETED WEB PAGE REDIRECTION

(75) Inventors: Christopher J. Kale, Richmond Hill (CA); Baldev S. Soor, Markham (CA)

(73) Assignee: International Business Machines Corporation, Armonk, NY (US)

( * ) Notice: Subject to any disclaimer, the term of this patent is extended or adjusted under 35 U.S.C. 154(b) by 929 days.

(21) Appl. No.: 10/729,295

(22) Filed: Dec. 5, 2003

(65) Prior Publication Data
US 2005/0015512 A1    Jan. 20, 2005

(30) Foreign Application Priority Data
May 23, 2003    (CA)    ................................. 2429761

(51) Int. Cl.
*G06F 15/16* (2006.01)
(52) U.S. Cl. ....................... 709/217; 709/203
(58) Field of Classification Search ................ 709/242, 709/238–240, 217, 245, 227–228, 203; 370/216, 370/229–242; 714/2, 4
See application file for complete search history.

(56) References Cited

U.S. PATENT DOCUMENTS

| 5,751,956 | A |  | 5/1998 | Kirsch .................... 395/200.33 |
| 6,014,660 | A |  | 1/2000 | Lim et al. ....................... 707/3 |
| 6,038,598 | A |  | 3/2000 | Danneels .................... 709/219 |
| 6,189,030 | B1 |  | 2/2001 | Kirsch et al. ................. 709/224 |
| 6,195,097 | B1 |  | 2/2001 | Shrader et al. .............. 345/356 |
| 6,308,205 | B1 | * | 10/2001 | Carcerano et al. ............ 709/221 |
| 6,338,082 | B1 |  | 1/2002 | Schneider ................... 709/203 |
| 6,466,966 | B1 |  | 10/2002 | Kirsch et al. ................. 709/203 |
| 6,606,653 | B1 | * | 8/2003 | Ackermann et al. ......... 709/219 |
| 6,952,723 | B1 | * | 10/2005 | Laiho ......................... 709/217 |
| 7,031,437 | B1 | * | 4/2006 | Parsons et al. ........... 379/88.12 |

(Continued)

FOREIGN PATENT DOCUMENTS

JP    11-272595    8/1999

(Continued)

OTHER PUBLICATIONS

"Runtime Inline Transformation of CGI Script Output," *IBM Business Machines Corporation*, Research Disclosure, Apr. 1999, p. 575.

*Primary Examiner*—Salad Abdullahi
(74) *Attorney, Agent, or Firm*—Winstead P.C.; Joseph E. Bracken

(57) ABSTRACT

The present invention provides redirection for a web page request for an old URL received at a web server. In an embodiment, a web page request from an end-user is redirected to a Common Gateway Interface ("CGI") script for handling the web page redirection. In an embodiment, the CGI script includes a routine for matching an old URL to a new URL provided in a lookup table. In an embodiment, each web page of an old URL has a corresponding new URL such that an end-user trying to access a web page using an old URL is always directed to a corresponding new web page, or to a relevant page if a corresponding new page does not exist. In another embodiment, a customized message may be associated with a match between an old URL and a new URL, and the customized message may be displayed prior to redirection.

3 Claims, 5 Drawing Sheets

U.S. PATENT DOCUMENTS

| | | | |
|---|---|---|---|
| 7,194,552 B1 * | 3/2007 | Schneider | 709/245 |
| 2001/0044825 A1 * | 11/2001 | Barritz | 709/203 |
| 2001/0051980 A1 | 12/2001 | Raciborski et al. | 709/203 |
| 2002/0054138 A1 * | 5/2002 | Hennum | 345/804 |
| 2002/0129092 A1 | 9/2002 | Tolson et al. | 709/202 |
| 2002/0194373 A1 * | 12/2002 | Choudhry | 709/242 |
| 2003/0158953 A1 * | 8/2003 | Lal | 709/230 |
| 2003/0208472 A1 * | 11/2003 | Pham | 707/2 |
| 2005/0268241 A1 * | 12/2005 | Lerner | 715/749 |

FOREIGN PATENT DOCUMENTS

| | | |
|---|---|---|
| JP | 2000-003347 | 7/2000 |

\* cited by examiner

FIG. 2C

| Old URL (http://...) 210 | New URL (http://...) 220 | Messages 230 |
|---|---|---|
| www.xyz.edu 202 | www.xyz.edu 202' | |
| /admissions 204A | /admissions 204A' | |
| /grad 206A | /grad 206A' | |
| /pages.html 208A | /program /arts /pages.html  /science-engineering /pages.html (NOT PART OF MAPPING) 208A' | "The web page you are seeking has been expanded and is now organized by program. You will be automatically redirected to the new page in a moment. Please update your bookmark." 208A" |
| /undergrad 206B | /undergrad 206B' | |
| /pages.html 208B | /program /arts /pages.html  /science-engineering /pages.html (NOT PART OF MAPPING) 208B' | "The web page you are seeking has been expanded and is now organized by program. You will be automatically redirected to the new page in a moment. Please update your bookmark." 208B" |
| /offices 204B | /offices 204B' | |
| /registrar 206C | /registrar 206C' | |
| /chancellor 206D | /chancellor 206D' | |
| /programs 204C | /programs 204C' | |
| /arts 206E | /arts 206E' | |
| /sciences 206F | /science-engineering 206H' | "The web page you are seeking has been merged. You will be automatically redirected to the new page in a moment. Please update your bookmark." 206H" |
| /engineering 206G | | |
| Requested web page not found. | www.xyz.edu 209' | "The web page you have requested has not been found. This may be due to an incorrectly coded HTML link, or a spelling error. You will be directed to the Home Page in a moment." 209" |
| 209 | | |

200C

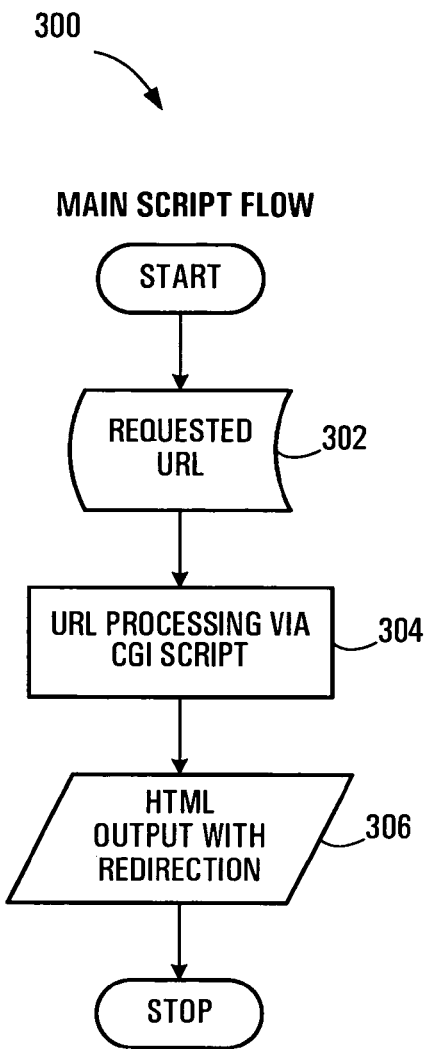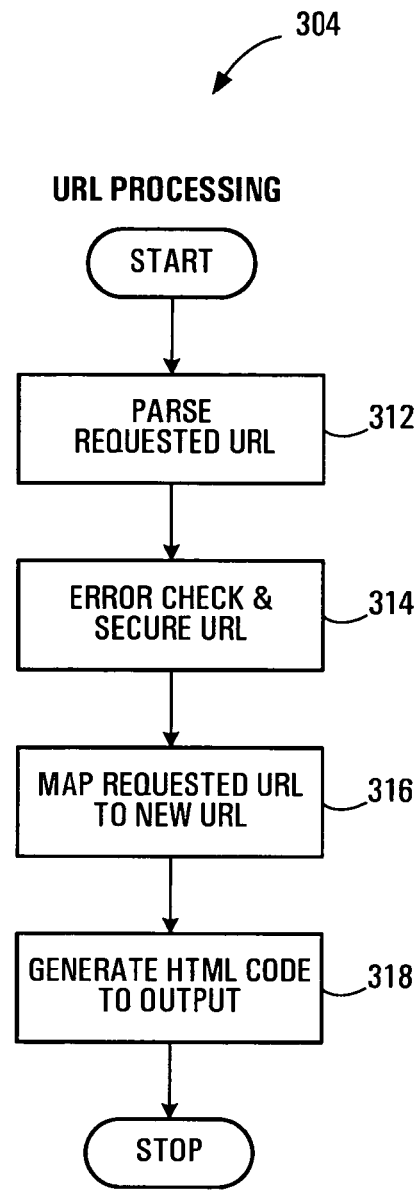
FIG. 3A
FIG. 3B

TARGETED WEB PAGE REDIRECTION

PRIORITY BENEFIT AND CROSS REFERENCE TO RELATED APPLICATIONS

This Application claims priority under 35 U.S.C. §119(a) to Canadian Patent Application No. 2,429,761 filed May 23, 2003, which is hereby incorporated herein by reference in its entirety.

TECHNICAL FIELD

The present invention relates generally to data processing systems, and in particular, to redirection of web page requests on the World Wide Web.

BACKGROUND INFORMATION

The World Wide Web, or WWW, is a hypertext information and communication system used on the worldwide network of computers commonly known as the Internet. WWW operates according to a client-server model using a HyperText Transfer Protocol ("HTTP"). HTTP provides user access to files using a standard page description language known as HyperText Markup Language ("HTML"). HTML is an application of Standard Generalized Markup Language ("SGML"), which is an international standard (ISO 8879) for text information processing. Files that are accessed using HTML may be provided in many different formats including text, graphics, images, sound, and video. HTML provides basic document formatting and allows a web developer to specify links to "web servers" and files. These links are specified using an addressing scheme commonly known as the Uniform Resource Locator ("URL"). By specifying a URL, an end-user or web server is able to access web pages formatted according to HTML from a web server connected to the WWW. Entering a URL often requires the input of a long string of characters. To assist the end-user, a bookmarking facility is typically provided in web browsers, allowing the end-user to save a URL for a web page being viewed. The end-user is then able to later access the bookmarked web page by selecting the bookmark from the web browser.

Over time, a web developer or data owner may wish to alter the organization or structure of web pages at a given web site. In the process, frequently, the address or URL of the web pages may also change. Consequently, when an end-user tries to access a web page for which the URL has changed, the end-user may receive an error message and be unable to connect to the desired web page. This often results in frustration and end-user dissatisfaction with the web site.

To address this problem, various solutions for redirecting an outdated URL request to a new URL have been proposed. For example, U.S. Pat. No. 6,338,082 discloses redirecting an end-user's web browser to a domain name registration site using the Domain Name System ("DNS") if the specified URL does not exit. As known to those skilled in the art, the DNS is a system which translates domain names to Internet Protocol addresses. Similarly, U.S. Pat. No. 6,014,660 also refers to translation within the DNS service. However, redirection through the DNS of more than a few web pages may be cumbersome and administratively difficult to set up.

Other proposed solutions have focused on redirection on the web server itself. For example, it is known that a web server configuration file in web server software may be used to redirect a request for a web page from an old URL to a new URL. However, redirecting pages at the web server configuration level may require extensive involvement of a web server administrator, which may be inconvenient for both the web server administrator and the data owner, if they are not one and the same. In any event, if there are significant changes to a web page data structure, and many web pages must be redirected as a result, using the web server configuration file to redirect each web page may prove to be quite impractical. Also, a web server configuration file may not permit specific targeting or sufficient flexibility in mapping old URLs to new URLs as desired by the data owner.

Thus, what is needed is a solution for redirecting web page requests which overcomes at least some of the drawbacks or limitations of known solutions as presented above.

SUMMARY OF THE INVENTION

The present invention provides targeted web page redirection which may be readily customized by data owners.

In an embodiment, a web page request from an end-user's web browser is redirected to a Common Gateway Interface ("CGI") script for handling the web page redirection. In an embodiment, the CGI script includes a routine for matching an old URL to a new URL provided in a lookup table. In an embodiment, each web page of an old URL has a corresponding new URL such that a web browser trying to access a web page using an old URL is always directed to a corresponding new web page, or to a relevant page if a corresponding new page does not exist. In another embodiment, a customized message may be associated with a match between an old URL and a new URL, and the customized message may be displayed prior to redirection.

The foregoing has outlined rather broadly the features and technical advantages of the present invention in order that the detailed description of the invention that follows may be letter understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 2C is an illustrative lookup table mapping old URLs to new URLs, and providing associated messages, if any; and FIGS. 3A and 3B are schematic flowcharts of an exemplary embodiment of the invention.

DETAILED DESCRIPTION

In the following description, numerous specific details are set forth such as specific network configurations, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1A:
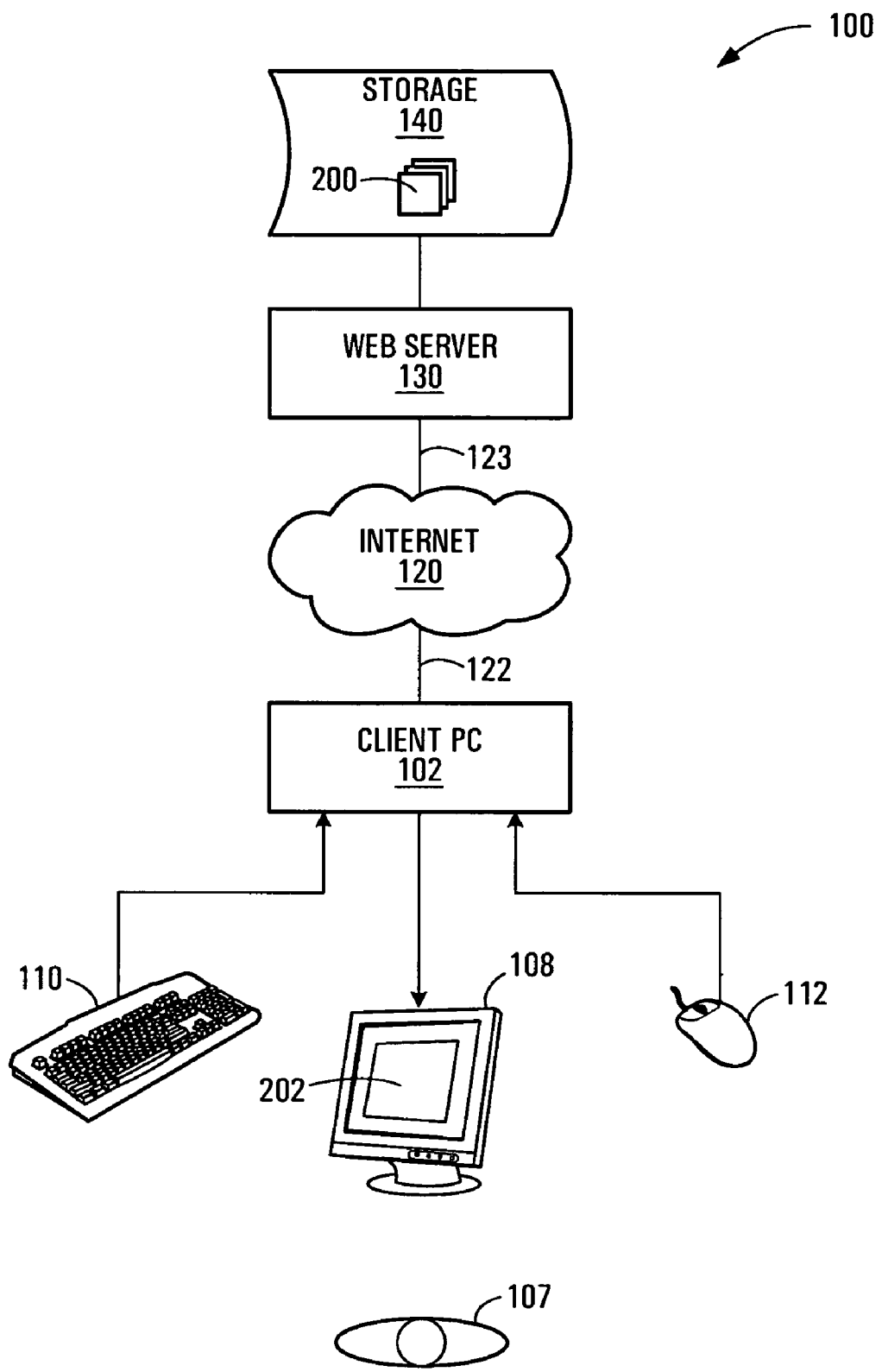
FIG. 1A is a schematic block diagram of a network which may provide an operating environment for exemplary embodiments of the invention.
Figure 1B:
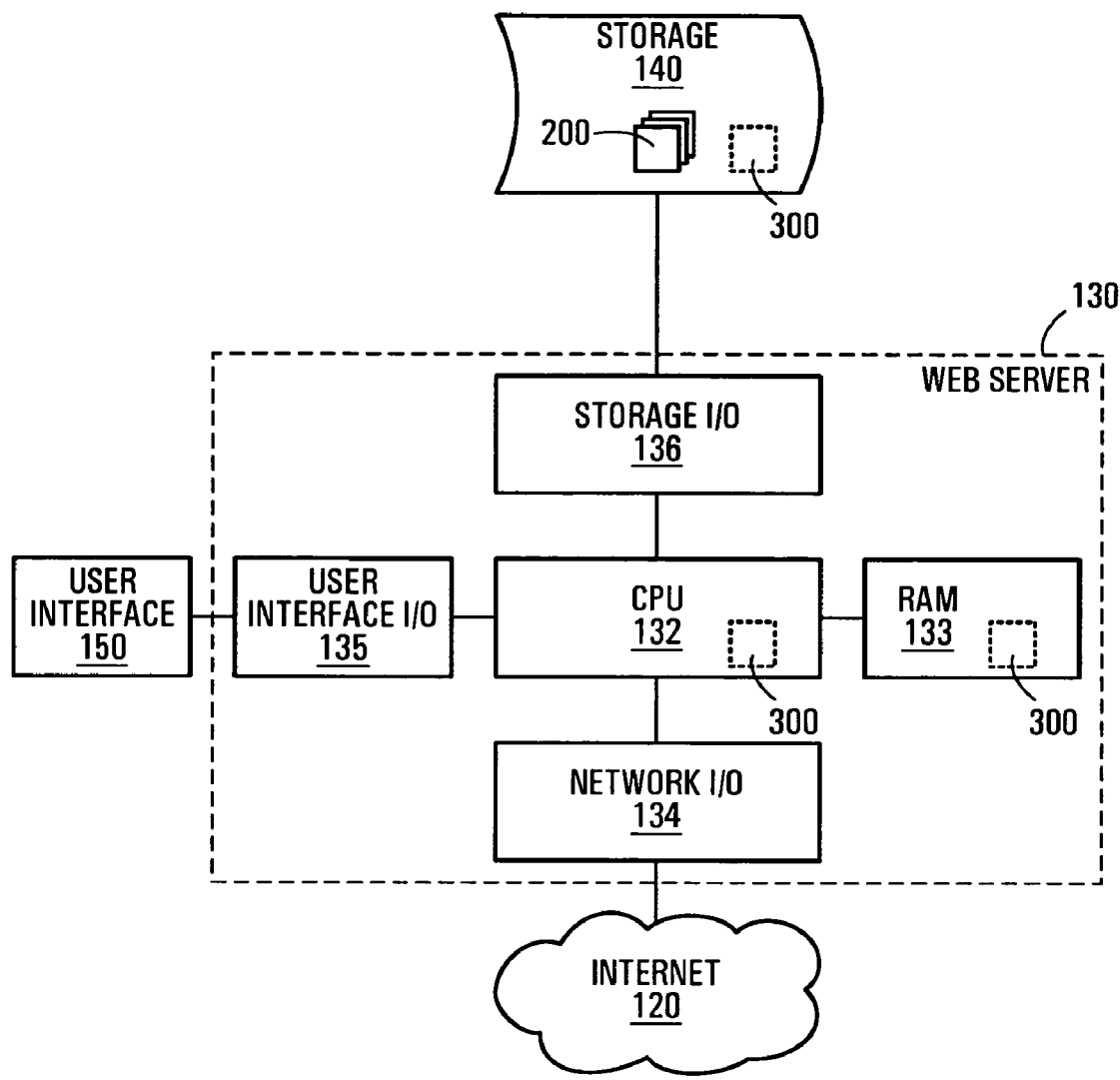
FIG. 1B is a more detailed schematic block diagram of a web server in the network of FIG. 1A.

Referring to FIGS. 1A and 1B, shown is a network 100 which may provide an operating environment for exemplary embodiments of the invention. A client PC 102 may be accessed by an end-user 107 via the user interfaces provided including, for example, a display 108, a keyboard 110, and a mouse 112. The client PC 102 is connected to the Internet 120 via a suitable Internet connection 122. A web server 130 is also connected to the Internet 120 by a suitable Internet connection 123. A storage unit 140 is connected to the web server 130 and contains a plurality of web pages 200, available to the end-user 107. One such web page 202 is shown in the display 108 of FIG. 1A.

The web server 130 may include a central processing unit ("CPU") 132 and an associated random access memory ("RAM") 133. As shown, a process 300 may be stored in the storage unit 140, retrieved and temporarily stored in RAM 133, and executed on CPU 132. The web server 130 may include various I/O modules including a network I/O module 134, a user interface I/O module 135, and a storage I/O module 136. As shown in FIG. 1B, a user interface 150 may be connected to the user interface I/O module 135. In an embodiment, the user interface 150 may include a monitor, keyboard, and mouse, which allows a web server administrator or web developer to access the web server 130. The web server administrator or web page developer may also connect remotely via the Internet 120, or another network (not shown) connected to the web server 130.

Figure 2A:
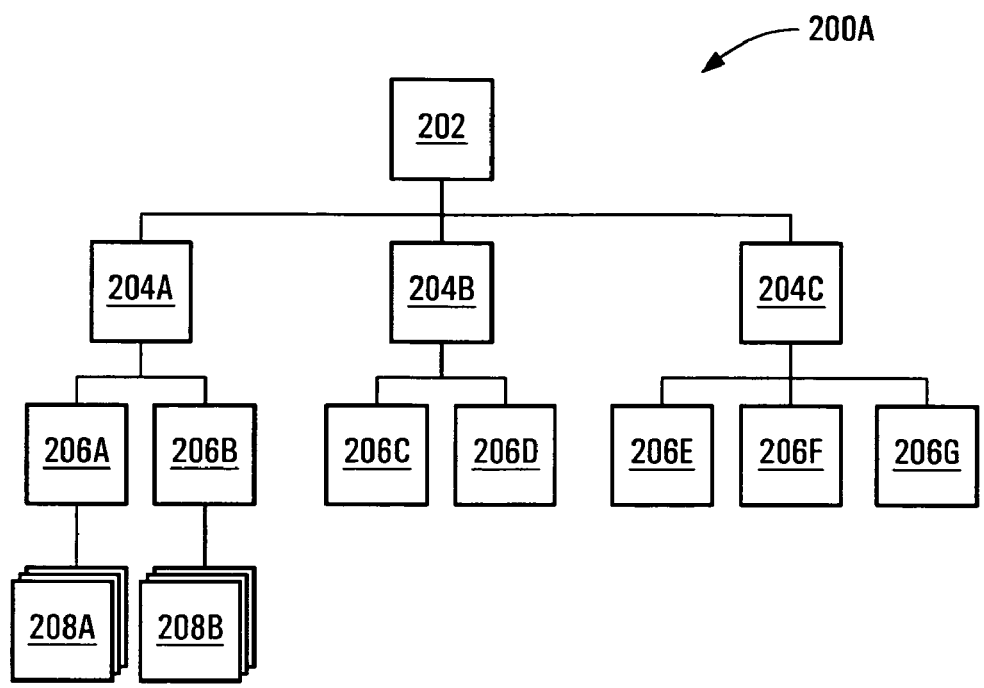
FIG. 2A is a schematic diagram of web pages organized into an illustrative tree data structure.

Now referring to FIG. 2A, shown is a schematic diagram of an illustrative tree data structure for a plurality of web pages 200A. A top level web page 202 branches into second level web pages 204A, 204B and 204C. Third level web pages 206A and 206B branch off from second level web page 204A, and each third level web page 206A and 206B has a plurality of web pages, 208A and 208B respectively, linked thereto. Other third level web pages including 206C and 206D branch off from second level web page 204B. Still other third level web pages 206D, 206F, and 206G branch off from second level web page 204C. Each of these other third level web pages 206C to 206G may have additional web pages (not shown) linked thereto.

Figure 2B:
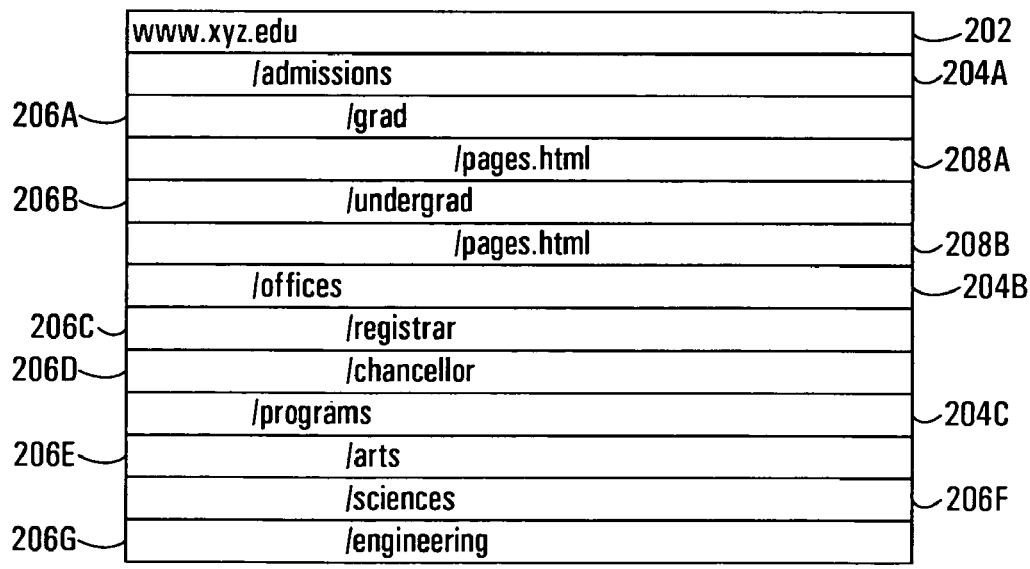
FIG. 2B is a table with illustrative URLs associated with the illustrative tree data structure of FIG. 2A.

Referring to FIG. 2B, a table 200B shows an illustrative example of URLs associated with the tree data structure shown in FIG. 2A. In the illustrative example, the top level web page 202 is associated with a top level URL "www.xyz.edu" of a fictitious XYZ College. The second level web page 204A is associated with the URL "www.xyz.edu/admissions". (Where a HTML page is not specified, an "index.html" page may be assumed.) As shown in FIG. 2B, various other illustrative URLs may be associated with the illustrative tree data structure 200 of FIG. 2A.

Now referring to FIG. 2C, shown is an illustrative lookup table 200C. Column 210 of the lookup table 200C is a list of "old URLs" corresponding to the illustrative URLs shown in table 200B of FIG. 2B. An additional line 209 is appended to column 210 to account for situations where a requested web page is not found, as will be explained further below. A second column 220 of the lookup table 200C is a list of "new URLs" corresponding to the old URLs shown in column 210. Herein, an "old URL" is an obsolete, outdated or invalid URL to which the web site owner no longer desires to grant end-users access to, while a "new URL" is a valid URL to which it is desired for end-user traffic to be directed to. For example, old URL 208A which reads:

"www.xyz.edu/admissions/grad/pages.html" may have been expanded to new web pages "www.xyz.eduladmissions/grad/program/arts/pages.html" and "www.xyz.edu/admissions/grad/program/science-engineering/pages.html" to provide more specific admission information by program. When the end-user 107 tries to access the old URL "www.xyz.edu/admissions/pages.html", either by directly typing in the old URL in a web browser or selecting the old URL from a bookmark facility, the web page request may be automatically redirected, as explained in detail further below. A third column 230 of lookup table 200C includes a customized message corresponding to the redirection between an old URL and a new URL. For example, message 208A" provides a customized message which may be provided to the end-user 107 when redirecting from old URL 208A to new URL 208A'.

Still referring to FIG. 2C, it is also possible that two old URLs 206F and 206G may be merged into one new URL 206H. In this case, more than one old URL may be mapped onto one new URL.

While the illustrative lookup table 200C is shown as a flat table in FIG. 2C, it will be appreciated that any suitable data structure may be used to map the old URLs to new URLs, and to associate messages, if any.

Now referring to FIGS. 3A and 3B, shown are schematic flow-charts of an exemplary embodiment of the invention. In an embodiment, the method 300 may incorporate a CGI script, as explained further below. As known to those skilled in the art, CGI is a standard for interfacing external applications with information servers, such as HTTP or web servers. A CGI script may be written in one of a number of programming languages, such as C/C++, Fortran, PERL, TCL, a Unix shell, Visual Basic, and AppleScript and be executed by a web server. A CGI script is executable in real-time so that it can output dynamic information. A CGI script may be accessible remotely from another web server. For more information on CGI scripts, the reader is directed to the official specification for CGI found at the following URL: http://hoohoo.ncsa.uiuc.edu/cgi/interface.html.

Method 300 starts and proceeds to block 302 at which a web page request is received from the end-user 107. The request may be in the form of a URL. For example, the end-user 107 may request access to "www.xyz.edu/programs/sciences" (block 206F). Method 300 receives the request and parses the URL to identify a suitable higher level URL, for example, the top level URL. In this example, the top level URL is "www.xyz.edu". Method 300 then proceeds to block 304 at which, based on the top level URL "www.xyz.edu", the request from the end-user 107 is passed to a CGI script associated with that top level URL. In an embodiment, the redirection of the URL request to the CGI script may be accomplished by using a "redirect" directive in a web server configuration file. Advantageously, this is the only redirection statement required in the web server configuration file. Thus, any URL requests having the top level URL "www.xyz.edu" may be automatically passed to the associated CGI script.

Entering the URL processing block 304, method 300 proceeds to block 312, at which the CGI script reads the specific web page request for "www.xyz.edu/programs/sciences" (block 206F). At block 312, the method 300 parses the URL to identify a specific web page, if possible.

The method 300 then proceeds to block 314, at which an error check and secure routine may be performed. If there is a security issue, such as harmful or malicious content in the parsed URL, the web page request may be stopped with an appropriate error message displayed (not shown). If the error check routine determines that the requested URL cannot be found, the "old URL" may be assigned the "value" of "requested web page not found." Otherwise, method 300 may proceed to block 316 for mapping.

At block 316, method 300 may proceed to map the requested old URL to the new URL based on the mapping in the lookup table 200C (FIG. 2C). For example, the URLs "www.xyz.edu/programs/sciences" (line 206F, column 210) and "www.xyz.edu/programs/engineering" (line 206G, column 210) have both been mapped to new URL "www.xyz.edu/programs/science-engineering" (line 206H', column 220). Also, an associated message 206H" explains that "The web page you are seeking has been merged. You will be automatically directed to the new page in a moment. Please update your bookmark."

Method 300 then proceeds to block 318, where method 300 may generate suitable HTML code corresponding to the mapping in block 316. Method 300 then leaves URL processing 304 and proceeds to block 306. At block 306, method 300 may output the message 206H" and then output the new URL mapped from the end-user's original web page request. Method 300 then ends.

In one embodiment, the CGI script may output a web page corresponding to the new URL directly to the end-user's web browser, rather than pass an instruction back to the web server for further processing. In this case, it will be appreciated that the CGI script will require end-user identifying information to be passed on to it by the web server, so that the output can be directed to the end-user 107.

In another example, in the opposite case where an "old" web page is expanded into multiple web pages, the redirection should be made to the lowest level web page still relevant to the web page requested. In the illustrative example, the old web page corresponding to URL "www.xyz.edu/admissions/grad/pages.html" has been expanded to include further subindex pages "www.xyz.edu/admissions/grad/program/arts/pages.html" and "www.xyz.edu/admissions/grad/program/science-engineering/pages.html" to provide more specific admission information by program. Referring to lookup table 200C, if the end-user 107 has requested the old URL "www.xyz.edu/admissions/grad/pages.html" (line 208A, column 210), the new URL will be "www.xyz.edu/admissions/grad/program/" (line 208A', column 220). In this case, line 208A' has been mapped as the "most relevant" page in the new web page data structure. When a web page data structure is changed in this manner, there may be many such instances in which only the data owner knows how the web page mapping should be made. Redirection software that relies on pattern matching, or some other non-specific redirection method, may not provide the targeted redirection desired. The data owner specified mapping provided by the lookup table 200C of the present embodiment provides accurate, targeted redirection of web page requests, which may lead to increased end-user satisfaction.

In a further example, if the end-user 107 has specified a URL which is not found, and the method 300 has assigned to the "old URL" the value of "requested web page not found", then at block 316, this "old URL" (line 209, column 210) may be mapped to the "home page" or "www.xyz.edu" (line 209', column 220), such that the web page request is still directed to a "relevant page". A customized error message 209" may be associated with this mapping, and may be presented to the user at block 306, substantially as described above.

As will be appreciated, the lookup table 200C shown in FIG. 2C may be expanded significantly to map many more pages, and associate many more messages. Also, it will be appreciated that there is significant flexibility in terms of mapping web pages within a lookup table, such as the lookup table 200C in FIG. 2C. Thus, hundreds or even thousands of web pages may be redirected in a targeted manner. By specifically targeting each request for a web page from an old URL 210 to a new URL 220, any frustration experienced by an end-user 107 when an old URL is not found may be significantly reduced. Furthermore, as the data content owner will be the most familiar with how this mapping should occur, the ability to provide targeted redirection to a relevant low level web page may be significantly improved.

Also, as the CGI script may be more readily accessible to the data content owner, the data content owner may provide detailed mapping from old URLs to the new URLs with minimal intervention from the web server administrator, and update the CGI script whenever required. Also, a customized message may be associated with each mapping to provide an enhanced end-user experience.

In another embodiment, as the web page redirection is handled by a customized CGI script which generates the necessary HTML code (at block 318 of FIG. 3B), the lower level URLs which are part of the top level URL may be located in many different physical locations. For example, it is possible that a request for a new URL may be directed to another web server (not shown) connected to the Internet 130.

Although the present invention and its advantages have been described in detail, it should be understood that various changes, substitutions and alterations can be made herein without departing from the spirit and scope of the invention as defined by the appended claims.

What is claimed:

1. A method of redirecting a web page request, comprising the steps of:
   receiving at a CGI script an old URL specified by a web browser;
   mapping said old URL to a new URL based on a data owner specified mapping accessible from said CGI script;
   outputting said new URL to said web browser;
   receiving said old URL at a web server;
   determining that said old URL is associated with said CGI script;
   passing said old URL to said CGI script; and
   parsing said old URL to identify a higher level URL in said old URL, and using said higher level URL to determine that said old URL is associated with said CGI script;
   wherein said step of passing said old URL to said associated CGI script comprises the step of using a redirect directive in a web server configuration file on said web server.

2. The method of claim 1, further comprising the step of associating a message with at least one data owner specified mapping of an old URL to a new URL.

3. The method of claim 2, further comprising the step of outputting said associated message to said web browser.

* * * * *